(12) United States Patent
Teitelbaum et al.

(10) Patent No.: US 11,815,287 B2
(45) Date of Patent: Nov. 14, 2023

(54) THERMALLY RADIATIVE APPARATUS AND METHOD

(71) Applicant: The Trustees of Princeton University, Princeton, NJ (US)

(72) Inventors: Eric Teitelbaum, Cinnaminson, NJ (US); Forrest Meggers, Princeton, NJ (US); Adam Rysanek, Vancouver (CA)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 130 days.

(21) Appl. No.: 16/764,616

(22) PCT Filed: Nov. 16, 2018

(86) PCT No.: PCT/US2018/061529
§ 371 (c)(1),
(2) Date: May 15, 2020

(87) PCT Pub. No.: WO2019/099834
PCT Pub. Date: May 23, 2019

(65) Prior Publication Data
US 2020/0393148 A1 Dec. 17, 2020

Related U.S. Application Data

(60) Provisional application No. 62/587,253, filed on Nov. 16, 2017.

(51) Int. Cl.
*F24F 5/00* (2006.01)
*F24D 3/14* (2006.01)
*F28F 13/18* (2006.01)

(52) U.S. Cl.
CPC ............ *F24F 5/0092* (2013.01); *F24D 3/14* (2013.01); *F28F 13/18* (2013.01); *F28F 2245/06* (2013.01)

(58) Field of Classification Search
CPC ............ F24F 5/0092; F24F 2005/0064; F24F 2013/221; F24D 3/14; F24D 2200/14;
(Continued)

(56) References Cited

U.S. PATENT DOCUMENTS 2,202,756 A * 5/1940 Sherrill ..................... F24H 1/40
126/658
3,323,582 A * 6/1967 Armstrong .............. F24D 3/165
165/49

(Continued)

FOREIGN PATENT DOCUMENTS

EP 1645827 B1 7/2011
JP 2015-36596 A 2/2015

OTHER PUBLICATIONS

R. N. Morse, et al., "A New Approach to Radiant Cooling for Human Comfort", (1963) Radiant Cooling, Architectural Science Review, 6:2, 50-53.

(Continued)

*Primary Examiner* — Travis Ruby
(74) *Attorney, Agent, or Firm* — MEAGHER EMANUEL LAKS GOLDBERG & LIAO, LLP

(57) ABSTRACT

Using thermal radiation to supply occupant comfort has long existed in the heating domain, and to a lesser scale in the cooling domain. Cooling power of radiant cooling systems is limited by the risk of condensation on the panel itself, as well as adjacent surfaces. Similarly, convective system losses to the ambient air prevent maintaining a large temperature difference from the surface and the surroundings. The disclosed approach combats these common pitfalls of radiant cooling systems in the building domain, increasing the power and therefore applicability of radiant cooling.

12 Claims, 5 Drawing Sheets

(58) Field of Classification Search
CPC .......... F28F 13/18; F28F 2245/06; F28F 9/20; F24S 10/40; F24S 10/501; F24S 10/74; F24S 2020/183; F24S 20/60; F24S 23/70; F24S 23/77; F24S 2023/84; F24S 80/50
See application file for complete search history.

(56) References Cited

U.S. PATENT DOCUMENTS

| | | | | |
|---|---|---|---|---|
| 3,872,911 | A * | 3/1975 | Janes | B64G 1/50 |
| | | | | 160/1 |
| 4,022,188 | A * | 5/1977 | Cohen | F24S 23/80 |
| | | | | 126/694 |
| 4,083,358 | A * | 4/1978 | Scott | F24S 23/77 |
| | | | | 126/663 |
| 4,121,653 | A * | 10/1978 | Vinz | F24D 3/14 |
| | | | | 165/49 |
| 4,178,911 | A * | 12/1979 | Mattson | F24S 10/75 |
| | | | | 126/675 |
| 4,205,719 | A * | 6/1980 | Norell | F24D 3/14 |
| | | | | 165/76 |
| 4,296,733 | A * | 10/1981 | Saunders | F24F 5/0046 |
| | | | | 126/619 |
| 4,421,203 | A * | 12/1983 | Bergamini | F24S 80/50 |
| | | | | 181/284 |
| 4,423,718 | A * | 1/1984 | Garrison | F24S 10/40 |
| | | | | 126/655 |
| 4,625,711 | A * | 12/1986 | Arai | F24S 80/56 |
| | | | | 126/673 |
| 5,263,114 | A * | 11/1993 | Tavernier | F24D 5/10 |
| | | | | 392/437 |
| 5,497,826 | A * | 3/1996 | Ingram | F24D 3/142 |
| | | | | 165/56 |
| 5,799,723 | A * | 9/1998 | Sokolean | F24D 3/148 |
| | | | | 165/49 |
| 6,883,590 | B1 * | 4/2005 | Messana | F24D 3/125 |
| | | | | 165/56 |
| 6,899,170 | B2 * | 5/2005 | Biter | B64G 1/503 |
| | | | | 165/133 |
| 6,923,248 | B1 * | 8/2005 | Weber | F24F 5/0092 |
| | | | | 165/56 |
| 7,275,842 | B2 * | 10/2007 | Wang | F21V 29/83 |
| | | | | 362/373 |
| 8,679,582 | B2 * | 3/2014 | Cumberland | B64G 1/54 |
| | | | | 427/226 |
| 9,551,487 | B2 | 1/2017 | Mirmobin et al. | |
| 2002/0124842 | A1 | 9/2002 | Fukutake et al. | |
| 2007/0181704 | A1 * | 8/2007 | Ernst | F24D 3/14 |
| | | | | 237/70 |
| 2008/0086981 | A1 * | 4/2008 | Kilkis | F24F 13/068 |
| | | | | 52/791.1 |
| 2010/0206300 | A1 * | 8/2010 | Shabtay | F24S 30/42 |
| | | | | 126/663 |
| 2010/0242507 | A1 | 9/2010 | Meckler | |
| 2011/0017725 | A1 * | 1/2011 | Figurelli | H05B 3/84 |
| | | | | 219/546 |
| 2011/0139148 | A1 * | 6/2011 | Milder | F24S 10/50 |
| | | | | 126/643 |
| 2011/0146950 | A1 * | 6/2011 | Yan | F24F 1/0047 |
| | | | | 165/67 |
| 2011/0258945 | A1 * | 10/2011 | Arbour | F24D 3/127 |
| | | | | 52/173.3 |
| 2012/0073567 | A1 * | 3/2012 | Winston | F24S 10/75 |
| | | | | 126/652 |
| 2012/0234033 | A1 * | 9/2012 | Kapany | F24S 10/72 |
| | | | | 62/262 |
| 2012/0273023 | A1 * | 11/2012 | Ely | H02S 20/23 |
| | | | | 136/246 |
| 2013/0192793 | A1 * | 8/2013 | Guckert | F24F 5/0092 |
| | | | | 165/49 |
| 2013/0199515 | A1 * | 8/2013 | Tandler | F28D 20/0039 |
| | | | | 126/623 |
| 2014/0116420 | A1 * | 5/2014 | Lefay | F24S 10/753 |
| | | | | 126/634 |
| 2015/0292772 | A1 * | 10/2015 | Murphy | F28D 20/0034 |
| | | | | 126/714 |
| 2015/0338175 | A1 | 11/2015 | Raman et al. | |
| 2016/0040908 | A1 * | 2/2016 | Peng | F24S 80/30 |
| | | | | 126/643 |
| 2016/0163943 | A1 * | 6/2016 | Cygan | H02S 40/22 |
| | | | | 136/206 |
| 2017/0022713 | A1 * | 1/2017 | Tandler | F28D 20/0034 |
| 2017/0160021 | A1 * | 6/2017 | Cognata | B64G 1/503 |
| 2017/0314837 | A1 * | 11/2017 | Alsadah | F28F 13/18 |
| 2018/0172296 | A1 * | 6/2018 | Buff | F24F 13/22 |
| 2020/0007071 | A1 * | 1/2020 | Regrut | H02S 40/22 |

OTHER PUBLICATIONS

Jin et al., "Overcoming limits to near-field radiation heat transfer in uniform planar media through multilayer optimization", Optics Express, vol. 25, No. 13, 14746-14759, Jun. 26, 2017.

Ognjen Ilic, et al, "Tailoring high-temperature radiation and the resurrection of the incandescent source", Nature nanotechnology, vol. 11, No. 4, 320-324, Jan. 2016.

Raman et al., "Passive radiative cooling below ambient air temperature under direct sunlight", Nature, vol. 515 540-544, Nov. 27, 2014.

www.interpanel.com.

International Search Report and Written Opinion for PCT/US2018/061529, dated Feb. 7, 2019.

* cited by examiner

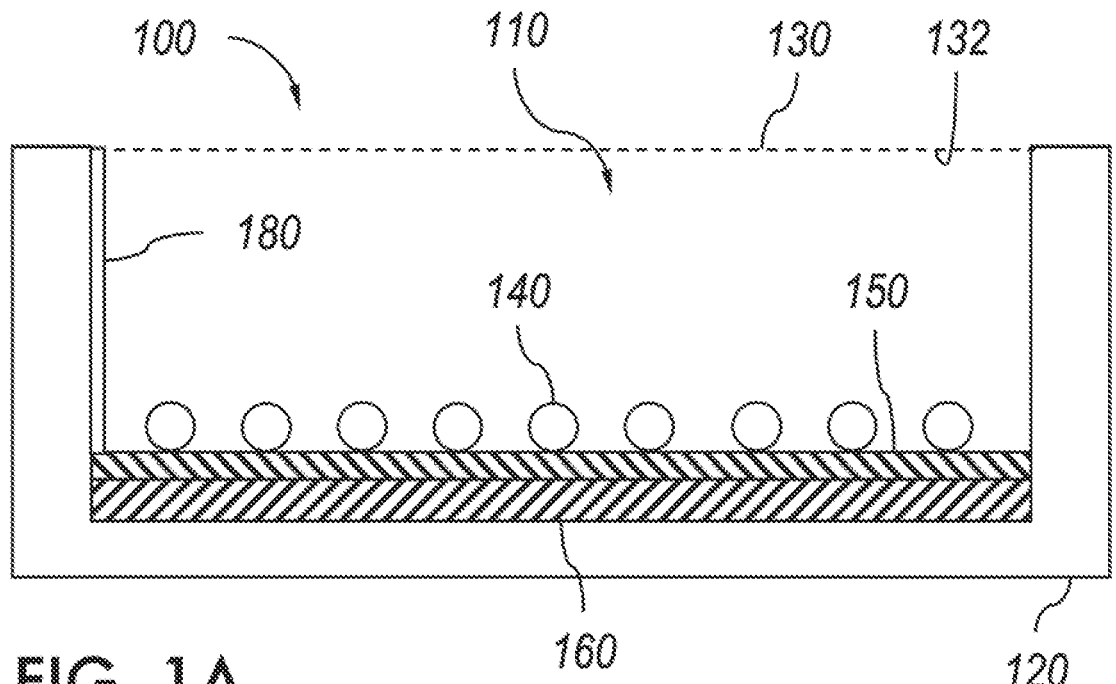
FIG. 1A
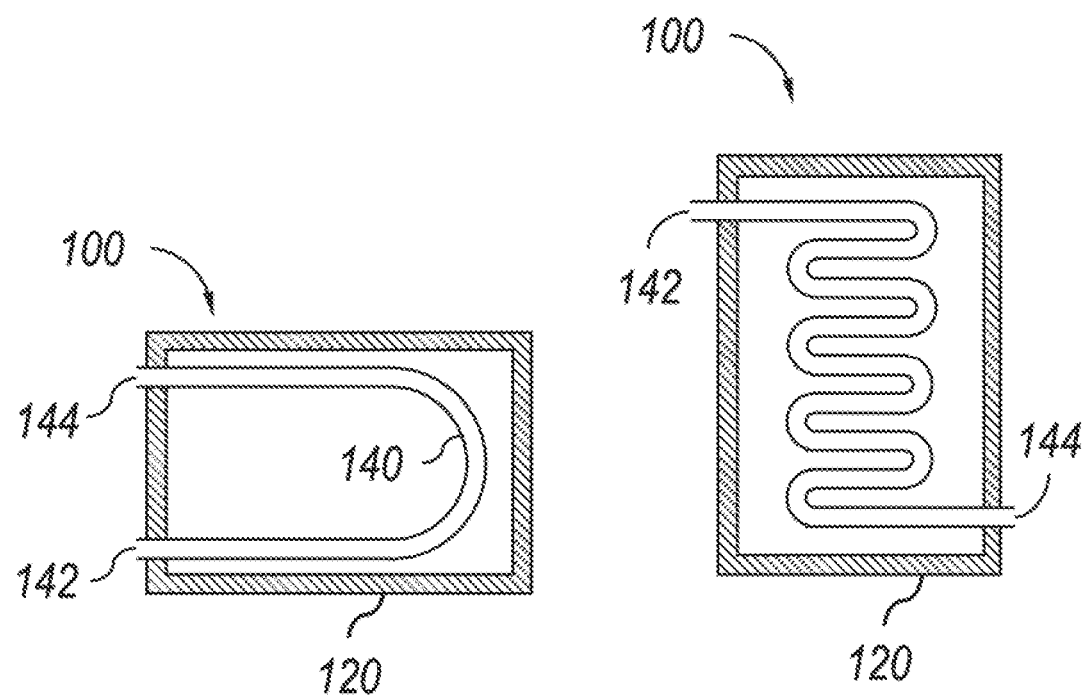
FIG. 1B
FIG. 1C

THERMALLY RADIATIVE APPARATUS AND METHOD

CROSS-REFERENCE TO RELATED APPLICATIONS

This application claims priority to U.S. Provisional Application No. 62/587,253, filed Nov. 16, 2017, which is herein incorporated by reference in its entirety.

TECHNICAL FIELD

The present disclosure generally relates to the field of air cooling and heating solutions. More particularly, the present disclosure relates to a thermally radiant panel for radiant heating/cooling applications.

BACKGROUND

Radiant cooling environmental systems are a class of measures and technologies for space cooling in the built environment. They involve exposing building occupants to mechanically-cooled indoor enclosures, or parts of entire enclosures, allowing for a greater degree of heat to be rejected radiatively by the human body to the ambient environment than would otherwise occur. While thermal comfort models demonstrate the potential for radiant cooling systems to provide comfortable conditions in spaces with high indoor air temperatures, in practice generating large air-to-panel temperature differences is hard to achieve without risking condensation occurring on chilled surfaces. It is for this reason that radiant cooling systems are nearly always combined with mechanical ventilation systems that supply dehumidified air to interior spaces, ensuring indoor air dew point temperatures are sufficiently low to prevent condensation arising on cooled surfaces.

An alternative solution to mitigating the risk of condensation can be found through a more focused investigation of the specific radiant heat transfer and convection processes occurring within and around radiant panel assemblies. In 1963, Morse (Morse, 1963) described a new type of radiant cooling panel for the tropical environments of Australia, whereby a membrane transparent to long wave infrared radiation is used to enclose, or isolate, the cold panel from the warm, humid ambient air. However, in the transfer process, condensation occurs on interior surfaces.

Morse solved this by utilizing a condensation-prevention heating element within his device in order to maintain the temperature very close to the dry bulb temperature of the room in which the panel was placed. However, both unwanted radiative and convective exchanges are current challenges in terms of providing low radiant temperatures for high air temperatures and humidity.

Thus, an efficient, thermally radiant device capable of cooling (or heating) occupants of a room that is capable of providing low radiant temperatures for high surface temperatures and avoids the requirement to utilize a condensation-prevention heating element, is desirable.

SUMMARY OF THE INVENTION

The present invention is drawn to a method and device for thermal radiant heating and cooling. Specifically, a thermally radiant panel.

Disclosed is a radiant cooling or heating device including a cavity covered by an IR transparent material, a reflector, and a fluid channel within the cavity positioned between the reflector and the IR transparent material. In certain embodiments, the cavity may not include a condensation-prevention heating element. In certain embodiments, the cavity may include a desiccant. In certain embodiments, the cavity has at least one non-radiantly activated surface, where each non-radiantly activated surface exhibits low emissivity and/or highly reflective in the IR spectrum. In certain embodiments, the cavity is capable of being evacuated. In certain embodiments, the ratio of the area of the opening to the surface area of the tube is at least 10:1. In certain embodiments, the temperature of an inner surface of the at least one channel is below the dew point of the external air. In certain embodiments, there is no reflector element. Advantageously, the device may also include either a plurality of low emissivity or high reflectivity internal louvres with a control system configured to direct and limit radiant transfer, or an active material coating the IR transparent material that can have its emissivity physically controlled or manipulated.

A system is disclosed that incorporates the disclosed radiant panel. The radiant panel is located within a room of a building, and the system also includes either a remote heat exchanger operably connected to the radiant panel, or a photonic solar reflector configured to generate cold directly on or supplied to the cavity.

A method for utilizing thermally radiant panels is also disclosed, which includes providing a fluid having a temperature below that of the local air temperature, passing or flowing the fluid through a channel within a cavity, where the cavity has an IR transparent material between the channel and the local environment, and reflecting at least a portion of the radiant cooling or heating through the IR transparent material and into the local environment. Advantageously, the fluid temperature is below the dew point of air in the local environment. In certain embodiments, the cavity does not contain a condensation-prevention heating element. In certain embodiments, the cavity contains a desiccant. In certain embodiments, the cavity has at least one non-radiantly activated surface, where each non-radiantly activated surface exhibits low emissivity and/or highly reflective in the IR spectrum. The method may also advantageously include either controlling radiant transfer by adjusting the positioning of a plurality of low emissivity or high reflectivity internal louvres, or controlling or manipulating the emissivity of an active material coating the membrane.

BRIEF DESCRIPTION OF THE DRAWINGS

FIG. 1A is a diagrammatic view of an embodiment of a thermally radiative device.

FIGS. 1B, 1C, and 1D are top-down views of embodiments of thermally radiative devices.

DETAILED DESCRIPTION

Figure 1D:
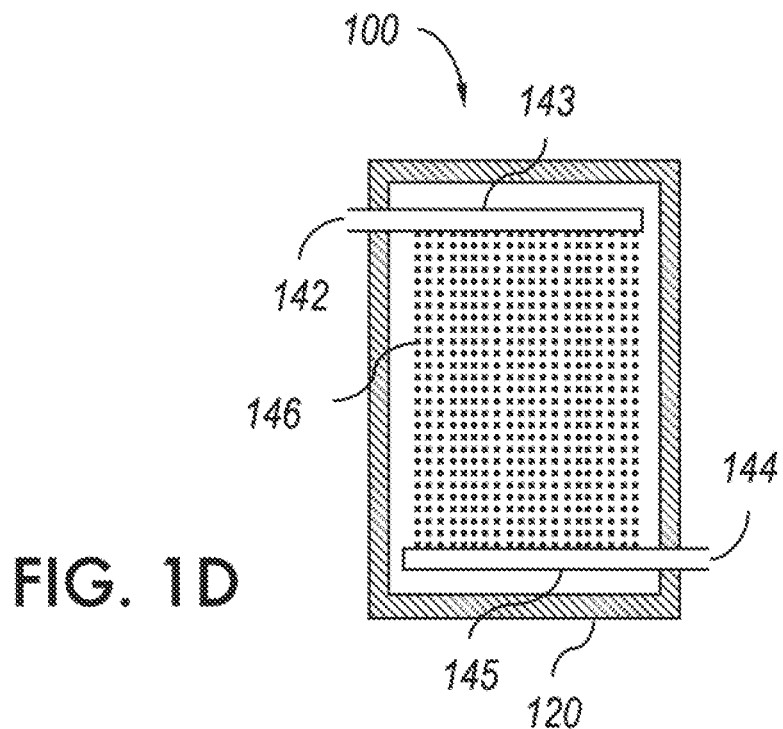

Disclosed is a thermally radiant device. Specifically, a radiant cooling or heating device. Referring to FIG. 1A, the thermally radiant device (100) includes a cavity (110) which may be defined by an inner frame (120). The inner frame in FIG. 1A is shown as a pair of side walls connected by a bottom portion, the frame may also just include the side walls.

Inner frame materials will typically have a thermal conductivities<5 W/m-K and preferably <0.5 W/m-K. Inner frame materials will typically have a specific heat>1000 J/kg-° C. and preferably >1500 J/kg-° C. The inner frame may include, but is not limited to, a wood (e.g., douglas fir timber, etc.), an extruded or expanded hydrocarbon polymer foam (e.g., STYROFOAM® polystyrene foam, etc.), or a thermoplastic resin (e.g., low density polyethylene (LDPE)).

In certain embodiments, the device may also include an outer frame that provides strength, rigidity, and/or weather resistance, comprised of a material such as aluminum.

The cavity (110) may be have a rectangular cross-section. However, the cavity but is not limited to such embodiments. In certain other embodiments, a circular cross-section may be useful. In other embodiments, custom or irregular shapes may be utilized.

The cavity (110) also has an opening defined by an inner surface (132) of an IR transparent material (130) that is substantially transparent to at least a portion of infrared (IR) radiation. The IR transparent material is configured to separate at least a portion of the cavity from external air.

The IR transparent material should be substantially transparent to IR. As used herein, the term "substantially transparent" refers to a material that allows transmission at least about 25% of light over a particular range of wavelengths. In some embodiments, the material is substantially transparent to the entire range of infrared light, typically light having wavelengths from about 700 nm to about 1 mm. In preferred embodiments, the material may be substantially transparent to infrared (IR) having wavelengths between 2.5 and 50 µm, more preferably having wavelengths between 6 and 15 µm, and still more preferably having wavelengths between 8 and 13 µm. In preferred embodiments, the material has at least 30% transmissivity in that range, more preferably at least 60%, and still more preferably at least 80%.

As is known in the art, a material's transparency is related to the thickness of the film, membrane, etc. Since most materials are not truly 100% transparent across a desired range of wavelengths, the thicker the material, the less transparent it may be. However, films and materials need a certain thickness in order to maintain structural integrity under normal use conditions. Thus, in certain embodiments, the IR transparent material has a thickness ranging between 1 µm and 50 µm, and more preferably between 3 µm and 20 µm.

In some embodiments, the IR transparent material may be an IR transparent glass, such as germanium or aluminum oxide (sapphire), a crystalline compound such as zinc selenide or cadmium telluride (CdTe) or a derivative, grapheme or a derivative, or a polymer, such as low-density polyethylene (LDPE), high density polyethylene (HDPE), or polypropylene (PE).

The thermally radiant device (100) also includes at least one channel (140). The channel may enter on one side of the cavity and exit on the same or any other side of the cavity. Referring to FIGS. 1B and 1C, embodiments of the channel may include, for example, a simple "U" shaped loop (FIG. 1B) as well as a more complex arrangement of "S" shapes (FIG. 1C). Alternatively, as depicted in FIG. 1D, a capillary mat can be used. In FIG. 1D, fluid input (142) eventually feeds into a fluid input manifold (143). The fluid then gets distributed to multiple smaller capillaries (146) before being received by a fluid output manifold (145), after which it eventually passes to the fluid output (144). In some embodiments, the fluid input is a channel having between a ½-inch and 1-inch inner diameter. In some embodiments, each capillary has between a ¹⁄₁₆-inch and ¼-inch inner diameter. In one example, the fluid input was a ¾-inch inner diameter pipe, and the capillaries were ⅛-inch flexible tubes.

It should be noted that a channel may be operably connected to a fluid inlet and outlet. In some embodiments, a fluid input is attached to a port in the frame (120) itself, with a fluid output attached to a separate port in the frame (120) itself. In those embodiments, the channel is connected to the port. In other embodiments, the tubing, piping, etc. that provides the channel has a portion that passes through the frame (120) and connects to a fluid stream. Other embodiments use a series of valves and process controls to ensure the channels are operably connected to a fluid stream.

In certain embodiments, one or more pumps may be used to control the flow of the fluid, which may include, but is not limited to, a positive displacement (PD) pump, or a peristaltic pump.

The channel typically has a single fluid inlet (142) and outlet (144), although other configurations may also be considered. For example, in some embodiments, multiple channels exist. In other embodiments, multiple inlets and outlets are connected to the channel in, e.g., a ladder-like arrangement.

The channel (140) may be composed of any non-insulating material. The channel may include flexible tubing and/or hard piping. In certain embodiments, the channels are thin polymer tubes. In other embodiments, the channels are copper pipe.

In some embodiments, the ratio of the area of the opening of the cavity (120) to the inner surface area of the channel is at least 1:1, preferably at least 5:1, and more preferably at least 10:1, and still more preferably 20:1. In one example, a panel having a 48×12 inch opening (576 square inch area) may use 58 inches of ⅛ inch schedule 10 copper pipe (0.312 inch inner diameter) to form the channel in the cavity, which can be calculated as having a ratio of 10.13:1.

In various embodiments, the fluid entering the channel has a temperature either higher or lower than the temperature of external air. For heating, the temperature is higher; for cooling, the temperature is lower. In certain embodiments, the fluid temperature is selected such that a temperature of an inner surface of a channel (140) in the cavity (110) is below the dew point of the external air.

The fluid is not necessarily restricted in any way. Preferred fluids are environmentally friendly, non-toxic fluids that are liquid in typical use conditions. For example, water may typically be used, although other fluids may also be utilized.

The cavity (110) may also include an insulated layer (160). Any thermally insulating material may be utilized, including but not limited to wood, blown or sprayed cellulose, wool, foams such as phenolic, polyurethane foam, and/or polyisocyanurate foam, cellular glass, and extruded polystyrene, and aerogels such as a silica aerogel.

The cavity (110) may also optionally include a reflector (150)—a reflective or emissive surface. In some embodiments, the channel (140) is between the IR transparent material (130) and the reflector (150). In some embodiments, the channel (140) is connected to the reflector (150), while in others the channel (140) and the reflector (150) are separated by an air gap. In some embodiments, the reflector (150) is positioned within the cavity (110) between an insulated layer (160) and the at least one channel (140). In other embodiments, mechanical actuators (not shown) are used to position louvres.

In various embodiments, the inner surfaces of the cavity (110) include at least one non-radiantly activated surface. In certain embodiments, this includes a portion of an interior surface of frame (120). In certain embodiments, each of these non-radiantly activated surfaces have either a low emissivity (emissivity coefficient<0.1) or are highly reflective (reflectance>90%) in the IR spectrum.

In preferred embodiments, the device does not utilize a condensation-prevention heating element in the cavity. In some embodiments, the cavity (110) contains a desiccant (180). Various desiccants are envisioned, including but not limited to Activated alumina, Benzophenone, Bentonite clay, Calcium chloride, Calcium oxide, Calcium sulfate, Cobalt(II) chloride, Copper(II) sulfate, Lithium chloride, Lithium bromide, Magnesium sulfate, Magnesium perchlorate, Phosphorus pentoxide, Potassium carbonate, Potassium hydroxide, Silica gel, Sodium chlorate, Sodium chloride, Sodium hydroxide, Sodium sulfate, alkoxylated siloxanes, or some combination thereof.

In certain embodiments, the cavity is capable of being at least partially evacuated. In certain embodiments, the cavity (110) contains a port in the frame (120) that is operably connected to a vacuum pump. The cavity (110) is then capable of being evacuated to pressures of, e.g., less than or equal to 600 torr, and more preferably less than or equal to 350 torr, and still more preferably to pressures less than or equal to 100 torr.

Figure 1E:
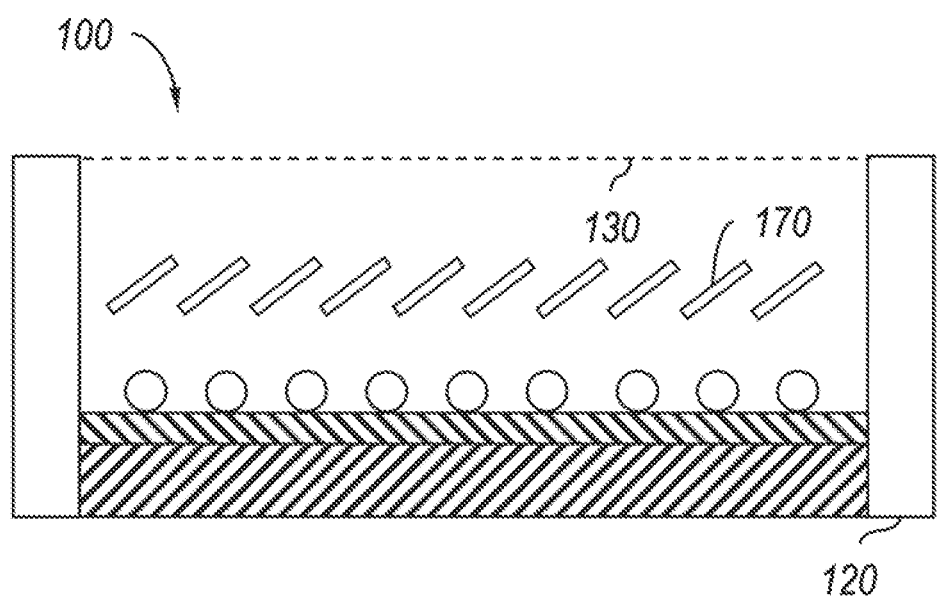
FIGS. 1E and 1F are diagrammatic views of embodiments of thermally radiative devices.
Figure 1F:
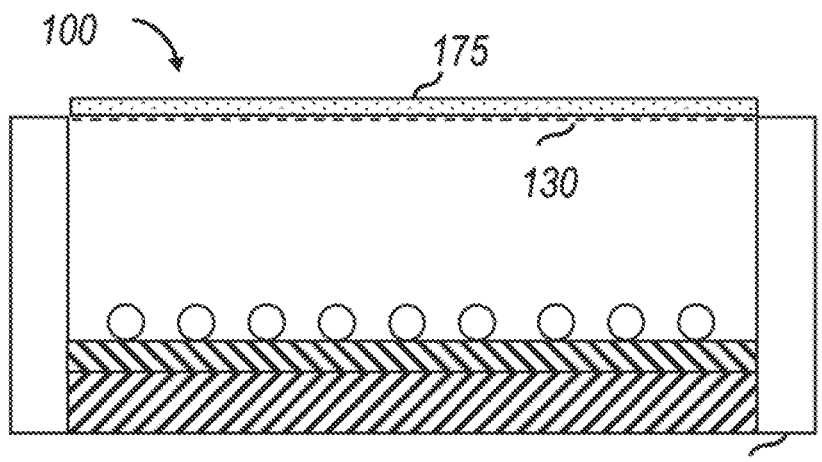

Referring now to FIGS. 1E and 1F, in certain embodiments, the device (100) includes an additional component that allows the device to control/direct/limit radiant transfer. In one embodiment (see FIG. 1E), the device (100) includes a series of louvres (170) internal to the device (100), typically operably connected to the frame (120). The louvres may be made of a material that exhibits low emissivity (emissivity coefficient<0.1) or are highly reflective (reflectance>90%) in the IR spectrum.

In another embodiment (see FIG. 1F), the device (100) includes an active material (175) coating the IR transparent material (130), where the active material (175) can have its emissivity physically controlled or manipulated. In certain embodiments, this active material can be, e.g., a $VO_2$-based coating.

Example 1

In one example, radiant panel frames were constructed with plywood, foam insulation, copper tubing, and aluminum. Douglas fir lumber was fashioned into a 53 by 20 cm open-face box, 7 cm deep with a 1.3 cm plywood back. The framing wood was 3.9 cm thick, providing interior panel dimensions of 45.7 by 12.1 cm. Inside the open-faced box, 3 cm foam insulation was cut to fit flush along the back of the frame, followed by a piece of 0.8 mm thick aluminum cut to fit flush against the pink insulation. This provided a base panel depth of 3.5 cm from the front face to the aluminum. A straight through copper pipe was then inserted through one side of the frame into the box. This copper pipe contains the chilled flowing fluid. All visible surfaces of the interior of the box were then spray painted black to make the metallic surfaces emissive ($\epsilon$=0.95).

The radiant panel frames were then outfitted with an IR transparent material—either HDPE, LDPE, or PP—across the top of the open box, sealed in a dry environment to minimize humidity inside the dry air gap. The depth between the membrane and panel backing was varied with wooden spacers to allow for 4 different depths: 3.5 cm, 7.8 cm, 9.9 cm, and 12.4 cm. The panels were outfitted with 4 Omega® Precision Surface Temperature Thermistors (+/− 0.1° C.). A first was placed on the copper pipe, a second placed inside the cavity on the metal reflector, positioned midway between the copper pipe and the panel side wall, and the third and fourth placed on the inner surface of the IR transparent material above the first and second, respectively. In addition, air temperature and relative humidity were measured inside the panel with a SHT75 temperature and relative humidity sensor (+/− 0.3° C.; +/− 1.8% RH) from Sensiron. Measurements were taken for 4 different panel configurations, facing "upwards" towards the ceiling, "downwards" towards the floor, "horizontally" facing a wall with the long dimension parallel to the floor, and "tilted" angled 30° towards the floor.

The performance evaluation of the panel was carried in a 1.5×2×2 meter room at the Embodied Computation Lab of Princeton University. Ultrasonic humidifiers, steam, and the building's in-floor radiant heat were used to generate indoor conditions in the room that would emulate a hot, tropical environment maintaining an air temperature of 30 to 32° C. and 70 to 80% RH. Temperature and humidity were continuously monitored with the SHT75 sensor and were recorded at 5 second intervals during experimentation.

Example 2

In one example, a panel was created that fits between standard 16 inch on center (OC) wall studs. The panel design, when considered as a series of layers, starts from a panel back, then insulation, then a conductive metal to spread the temperature, emissive paint to coat the metal, a copper cooling "U" channel (in contact with the coated metal), and an infrared (IR) transparent membrane to cover the entire panel and seal the inner workings from the room environment. Sub-$T_{dp}$ cold water was supplied to the "U" channel. Condensation was avoided due to (a) dry or (b) vacuum conditions maintained in the panel through the vacuum port connection. In this manner, condensation is avoided but radiant cooling is maximized, and unwanted convective gains from the air in the space to the panel are also avoided as steady state convection and conduction into such a panel tend to be low.

An initial model calculating radiant heat transfer between two objects more rigorously was developed to facilitate comparisons between different materials for the IR transparent membrane. Assuming a minimal wavelength dependence for the emissivity of both clothing and skin, i.e. both are approximated as gray bodies is a good assumption. However, materials that could be chosen for the membrane material may not be black bodies. Therefore, a wavelength-dependent technique must be employed to calculate the net radiant heat transfer. One approach is to subtract the gray body power spectra from a radiant cooling panel at a first temperature from a human at a second temperature and multiply the resulting spectra by the wavelength dependent transparency of the membrane, $\tau_m$, to generate a curve. Integration under this curve is the simple radiant heat transfer model, providing information on heat transfer that would occur for a given view factor in the steradian and available surface area on the occupant.

It may be desirable to understand the steady state temperature profile within the radiant panel, as this will determine the cooling potential, as well as the degree to which the system needs to be sealed form the external environment. For this analysis, initially it may be assumed that convection inside the panel will be minimal. A control volume approach was employed for the analytical heat transfer model, which examines specifically the radiant panel and the emitter. The overall energy balance for such a system with an air cavity separating a radiant source from the environment through a transparent membrane yields the steady state temperature of the membrane surface:

$$T_m = \frac{w_m}{2k_m}\left(2\varepsilon_m\sigma\left(\frac{T_{m,\text{int}} + T_{m,ext}}{2}\right) - \alpha_m\sigma T_p^4 - \alpha_m\sigma T_{air,room}^4\right) - \frac{k_{air}w_m}{k_m w_{air}}(T_p - T_m) + T_m\,..$$ (Eq. 1)

Here, subscript m indicates the IR transparent membrane, p panel, $\alpha$ is the absorptivity of the membrane, k is the thermal conductivity of a material noted in the subscript, and w is width. The condition $T_m > T_{dp}$ should be met to avoid condensation, rather than $T_{supply} > T_{dp}$, which allows for colder $T_{supply}$, and therefore smaller surface areas for radiant cooling, or higher $T_{air}$.

When viewed with the thermal camera, the panel described in Example 2 radiated at a temperature between 15 and 17° C., below the dew point, and inspection revealed there was no condensation implying the surface temperature of the polyethylene was indeed above the dew point. The 10° C. supply temperature is not particularly cold, but is significantly cooler than the standard radiant cooling supply temperature of 18.3° C. The supply temperature could be lowered even further for even more radiant cooling.

In general, when implementing radiant cooling panels, there are typically two limiting factors dictating the temperature difference between the air and the panel. First, convection will cool the air as in a passive chilled beam, increasing the surface temperature and reducing radiant cooling. Secondly, surfaces that have the radiant cooling panel in their view factor will also be radiantly cooled by the panel, such as floors, carpet, and walls. By sealing to cold temperature source behind an infrared transparent membrane to avoid condensation, the convective cooling of air is also addressed. However, sufficiently low surface temperatures may still cool opposite surfaces below the dew point.

Thus, some embodiments may utilize a reflective surface to reflect the radiant cooling from cold surfaces, rather than radiantly cool the non-activated materials.

To examine the functionality of the sub-$T_{dp}$ radiant cooling panel in a real system, an experiment was conducted in winter in Princeton, NJ using the cold surfaces of an uninsulated shed to act as a radiant cooling panel. A 3.7 m×3.7 m×1.8 m (L×W×H) shed was outfitted with IR transparent LDPE membrane on the ceiling and two adjacent wall surfaces, and reflective mylar on the floor and other two wall surfaces. The polyethylene acts as the barrier to prevent condensation on the cold wall surfaces that it conceals. The mylar reflects the opposite surfaces, preventing opposite non-radiantly activated surfaces from being radiantly cooled instead of occupants. The shed was heated and humidified to mimic summer ambient conditions with high dew point. Cold ambient temperatures led to cold wall temperatures, typically around 0° C. maintained cool wall temperatures, which served as radiant cooling panels.

The mean radiant temperature was monitored using a black globe temperature sensor, and the air temperature was monitored with a DHT22 temperature and humidity sensor from Adafruit Industries. The temperature of the polyethylene was also monitored with a DS18B20 RTD temperature sensor (±0.5° C.) from Maxim IC, and a representative wall cavity temperature and humidity were also monitored with a DHT22. This allowed for calculation of the dew point in a wall cavity, as well as the room, to predict when condensation would occur.

Air temperature, relative humidity, and Mean Radiant Temperature (MRT) data were plotted. The data was recorded as a time series data set at regular intervals. The exciting data points lie on the $T_{MRT} = T_{dp}$ isocomfort line, meaning a $T_{MRT}$ was achieved at or below $T_{dp}$, satisfying a desirable comfort condition. These data points were collected without condensation on any surface, despite the low surface temperatures required.

Recent work has begun using nanophotonic-based approaches for sky cooling, allowing materials in direct sunlight to radiatively cool to the sky below the ambient air temperature. The night sky is an enormously deep well of thermodynamic potential during nighttime hours, as it is readily accessible as a cold temperature sink. These new photonics patterning and optimization approaches have allowed the daytime sky to additionally act as a cooler, using novel materials and design techniques to allow for selective reflection and emission. See, e.g., Aaswath P Raman, Marc Abou Anoma, Linxiao Zhu, Eden Rephaeli, and Shan-hui Fan. *Passive radiative cooling below ambient air temperature under direct sunlight.* Nature, 515(7528):540-544, 2014. This approach must maintain an orthogonality condition to the sun to work, even though emission was optimized for all sky angles. Geometrically, this is not an ideal system, as emission optimized hemispherically will encounter the ground of the planet at extreme sun angles. Therefore, a reflector at all angles would be an ideal material.

Similar work has been conducted that switches the emitter geometry, containing a hot incandescent filament inside a sphere of the photonic crystal emitter itself. See Ognjen Ilic, Peter Bermel, Gang Chen, John D Joannopoulos, Ivan Celanovic, and Marin Soljacic. Tailoring high-temperature radiation and the resurrection of the incandescent source. Nature nanotechnology, 11(4):320-324, 2016. This allows for transmission of only wavelengths that our eyes respond to, keeping the color rendering associated with incandescent light bulbs, but increasing efficiency 40% since other radiation is reabsorbed by the emitter.

To be more specific, the governing equation is shown in the following equation, where the net cooling power of the radiative cooler is equated to atmospheric and solar conditions:

$$P_{cool}(T) = P_{rad}(T) - P_{atm}(T_{amb}) - P_{sun} - P_{cond+conv}$$ (Eq. 2)

Expanding the second term, $P_{rad}(T)$, it is clear that rejected power to the sky is integrated over the entire hemisphere:

$$P_{rad}(T) = A\int d\Omega \cos\theta_0 \int_0^\infty d\lambda I_{bb}(T,\lambda)\epsilon(\lambda,\theta), \text{ where } \int d\Omega = \int_0^{2\pi} d\theta \sin\theta.$$ (Eq. 3)

However, this is for emission, and not reflection of incoming radiation vectors from the incoming sun. In fact, the radiant cooling panel should be kept orthogonal to the sun's rays.

When dealing with solar radiation in particular, reflection across the entire range of the sun's motion would be preferable, as seasonal and daily multi axis tracking are not trivial.

One embodiment of steps one must take to perform a generalized optimization of a multilayer photonic crystal for reflection over a larger range of wavevectors, $k_\beta$, are discussed below.

To begin a general method for optimization of the layers in a multilayer 2D photonic crystal, a multilayer 2D photonic crystal is optimized for reflection at a given frequency by changing the thickness, $t_N$ and dielectric, $\varepsilon_N$, for layers 1 to N. Overall reflection is calculated at the interface at the $N^{th}$ layer.

Since the layers do not vary in the z dimension, the system is translationally invariant in the x, y plane. From this fact, it is relatively straightforward to derive individual transmission and reflection coefficients, $\rho_i$ and $\tau_i$. After correcting those equations to account for changing layer width as a function of angle of incidence, $\theta$, the equations can be written as:

$$\rho_i = r_i \frac{1 - e^{\frac{2ik_{zi}t_i}{\cos\theta}}}{1 - r_i^2 e^{\frac{2ik_{zi}t_i}{\cos\theta}}} \quad \text{(Eq. 4)}$$

$$\tau_i = \frac{(1 - r_i^2)e^{\frac{2ik_{zi}t_i}{\cos\theta}}}{1 - r_i e^{\frac{2ik_{zi}t_i}{\cos\theta}}} \quad \text{(Eq. 5)}$$

Such treatment allows for material thickness to be varied as a function of changing thickness dependent on angle of incidence. Still, the overall reflection can be calculated from recursively computing the reflectivity at each layer.

Perhaps an intelligent way to develop a solving algorithm would be to use the small angle approximation for small values of $\theta$ to discretize the range between 0 and $\pi$. Jin et al. cite several algorithms for quick solving approaches. See W. Jin, R. Messina, and A W Rodriguez. Reflection coefficient for multilayer structures. However, the order of the problem has now increased by a factor of the division of the incident range angle. For instance, now reflectivity may be calculated at each incident angle given in equation 6.

$$R_{i,\theta} = \rho_{i,\theta} + \frac{\tau_i^2 R_{i-1,\theta}}{1 - R_{i-1,\theta}\rho_{i,\theta}} \quad \text{(Eq. 6)}$$

This equation is an updated form of the equation for $R_i$ that includes a subscript $\theta$ indicating angle of incidence. This is an important update to the equation, as the order of the problem has increased.

However, Bloch's theorem tells one that the mode frequencies must also be periodic. Therefore, when optimizing a material for reflection across frequency and angle of incidence, the problems are related based on the power spectrum, $P_{sun}$ from equation 2. As $\theta$ is varied, Bloch states change as well. Therefore, the combined problem of maximizing a function over both frequency and angle of incidence is even more complex. Ideally the updates to equation 6 for an angle of incidence condition and method of first attempting to discretize the range from 0 to $\pi$ can yield useful preliminary results.

Experiments performed for this study were useful in demonstrating the ability to radiantly cool occupants without radiantly cooling opposite surfaces and confirming a method by which low radiant temperatures can coexist with high air temperatures and humidities. Further, designing intelligently for radiant reflection and transmission is not impossible. Furniture materials are a potential target for becoming radiant reflectors rather than emitters, and a new wave of nanophotonics research is producing wearable radiative cooling clothing to allow occupants to radiatively interact with activated surfaces. Similar materials could be used for the panels as well.

Measuring precisely the temperature of the polyethylene surface was difficult due to the non-gray body emissivity of the polyethylene and the temperature dependence on radiation, conduction and convection. Placing a temperature sensor in thermal contact with the material would work only if the sensor body was a perfect reflector so as to reduce radiative exchanges with the surroundings. However, since the temperature of the polyethylene is at thermal equilibrium with its surroundings, the surface area of an ideal sensor would be small, making thermal insulation of the side of the sensor not in contact with the polyethylene difficult.

Thermal inertia is a challenge that must be considered moving forwards. Sudden increases in humidity and air temperature may cause condensation on materials that should not have experienced condensation, such as the wood of the radiant cooling panel's frame. Likely environmental changes occurring too quickly for equilibrium to occur would bring about this condensation.

Most recently, the system has been evaluated in an outdoor pavilion configuration, monitoring cooling rates, temperature gradients, etc. The system consists of ten 4 foot by 8 foot panels configured in an outdoor enclosure that allows air to enter so that the air remains at the ambient temperature. Chilled water is pumped through the capillary mats in the panel (FIG. 1D). The minimum allowable supply temperature to avoid condensation has been empirically determined to be:

$$T_{water} \leq 2.95 T_{dewpoint} - 1.95 T_{air}$$

This relationship equates the amount of subcooling of the water below the dewpoint to the amount of convective heating able to be supplied to the outer surface of the membrane from the air to help avoid condensation as the membrane cools. This relationship depends on system geometry, installation quality, and general dryness and cleanliness of the membrane; however, it can be established for any system designed with these panels.

Further, the mean radiant temperature tracks the water temperature closely, and remains separate from the air temperature. This is a successful demonstration of concept, isolating the mean radiant temperature as the metric for thermal comfort, independent of the air temperature, contrary to the air condition and air-based heating paradigms that are prevalent today. The operating conditions have used supply water temperatures between 5 and 20° C., preferentially 10-15° C. within air temperature ranges between 29 and 33° C. and dew points between 23 and 25° C. The overall power consumption has been 200 W per panel, which each provide 480 W of cooling. There are several mechanisms subsequent versions will deploy to increase the COP of this system.

Figure 3:
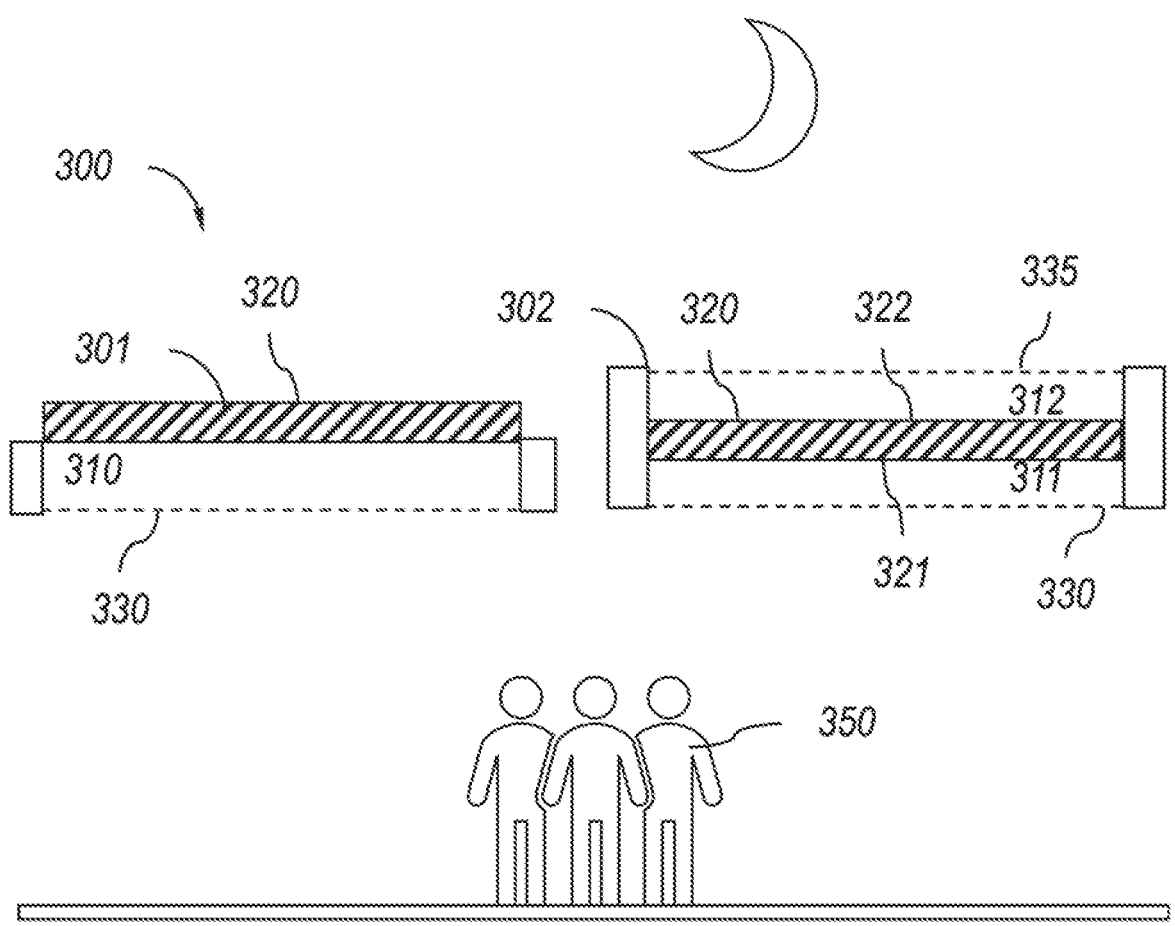

Since these panels are outside with direct exposure to the sky, the next step could be towards making the passive version with spontaneous sky cooling, shown in FIG. 3.

In certain embodiments, such as the one shown in FIG. 3, a system (300) includes a photonic solar reflector configured to generate cold directly on or supplied to the cavity. As seen in FIG. 3, a building or other outdoor structure (within which individuals (350) can be cooled or heated) are exposed to thermally radiant devices (301, 302). One device (301) in FIG. 3 is shown has having a cavity (310) defined by the frame walls, a photonic solar reflector (320) (e.g., a radiative sky cooling panel or film) and an IR transparent material (330).

In certain embodiments, no fluids or channels are required in these devices—the photonic solar reflector (320)—the sky cooling panel or film is configured to reduce the temperature within the cavity. The bottom surface of a photonic solar reflector will spontaneously get cold when the top surface is exposed to the sky. With this in mind, the photonic solar reflector can reduce temperature in the cavity directly (e.g., the bottom of the solar reflector—without insulation—may be in thermal communication with the cavity) or by indirectly supplying it to the cavity. (e.g., via a heat exchanger that cools water supplied to a channel in the cavity). In certain embodiments, the photonic solar reflector (320) would be modulated so that there is no reflection or emission in the 6-15 micron band, just transmission to the sky, however solar radiation is reflected. This also works at night when solar radiation is not present.

One device (302) in FIG. 3 is shown as having two cavities (311, 312). The first cavity (311) is below the photonic solar reflector (320), between the solar reflector and the individuals (350). The first cavity also includes a lower surface (321) of the photonic solar reflector (320) that faces a first IR transparent material (330). The second cavity (312) is positioned above the photonic solar reflector (320), between the solar reflector and the sky (the side facing the moon, as shown in FIG. 3). The second cavity has an upper surface (322) of the photonic solar reflector (320) that faces a second IR transparent material (335). The two IR transparent materials (330, 335) are generally identical to the IR transparent material (130) from FIG. 1A. In some embodiments, the two IR transparent materials are the same material. In other embodiments, the two IR transparent materials are different materials.

Other embodiments may utilize thermally radiant devices, such as the embodiment depicted in FIG. 1A, each with a single cavity, but flipped such that the IR transparent material—the thermally-active surface—faces the sky. In operation, the thermally-active surface is maintained at a warm temperature, above ambient air temperatures, through the flow of warm fluid through its channels. When this warm surface is exposed visible to the night-time sky, the panel loses heat, or cools, radiatively to the sky. In other embodiments, multiple thermally radiant devices are utilized. In preferred embodiments, the warm fluid is between 5 and 15 degrees C. above ambient air temperatures, or absolutely between 35 and 50 C. In certain embodiments, the system also utilizes an external temperature sensor. In certain embodiments, the system does not pass fluid through the channels if the measured external temperature is not less than the fluid temperature.

A novel solution to thermal inertia, i.e. changing the timescale through which control can be performed, would be to tune the emissivity in the thermal, 6-15 μm range. Such a solution has never been applied to such large wavelengths, but new research in wrinkling and folding elastomers could provide solutions for coatings that change emissivity in the far infrared range. Such an implementation may change the perceived temperature due to a change in the emissivity at the surface of the material. Therefore, if the air temperature changed suddenly in a space and a radiantly heated concrete slab with a large thermal mass was providing an uncomfortably high radiant temperature, rather than waiting for the slab to cool down, a small charge could be applied to the material to induce wrinkling to reduce the emissivity.

The perceived change in temperature would occur on the time scale of the wrinkling phenomenon, rather than the time scale of the slab cooling down. While these structures are typically used to scatter and retain light in a structure to increase solar PV efficiency 200 nm further into the spectrum, the same approach could be used to tune emissivities into the human thermal band of the spectrum.

Figure 2:
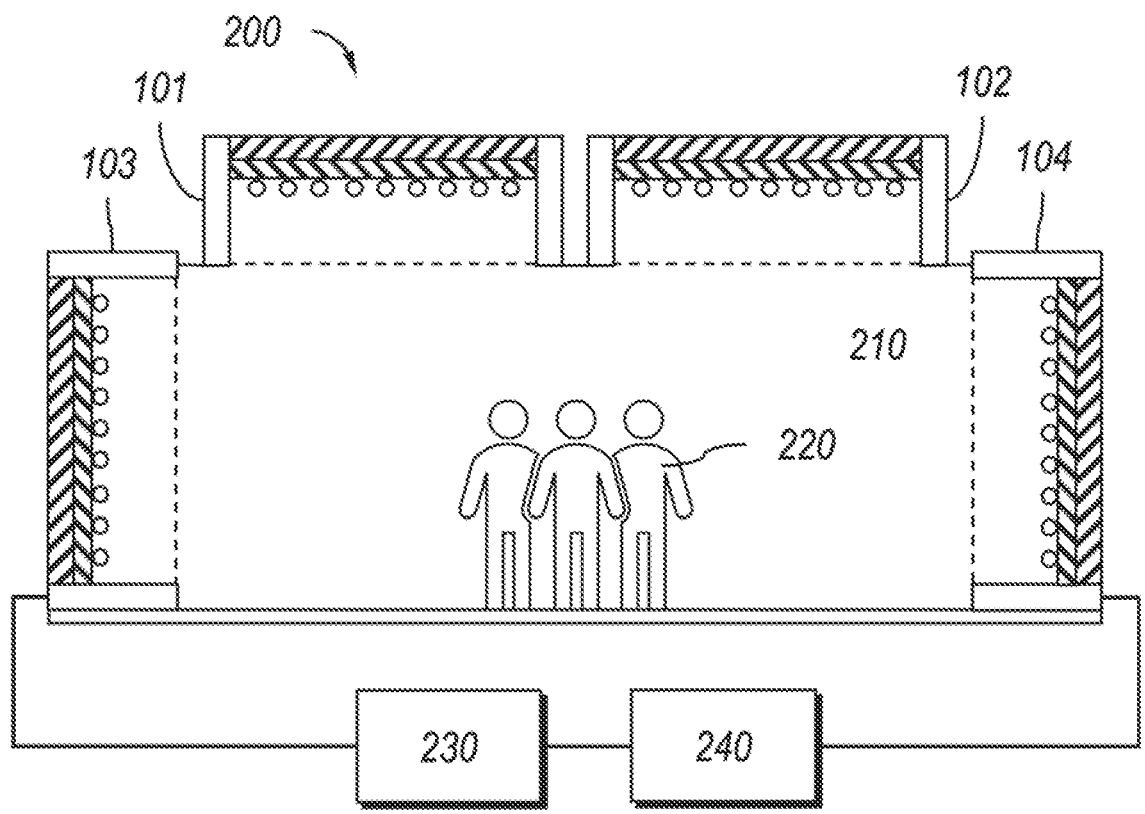
FIGS. 2 and 3 are diagrammatic view of an embodiment of a system utilizing thermally radiative devices.

Other systems are also envisioned. Referring to FIG. 2, one system (200) may utilize one or more thermally radiant devices (101, 102, 103, 104) in order to alter the temperature one or more individuals (220) experiences within a room (210). The thermally radiant devices may be positioned within the room. They may specifically be positioned in the ceiling (See 101, 102) or walls (see 103, 104) of the room. In preferred embodiments, the dimensions of each device may be configured to fit between the studs used for the room—in the United States, the studs are typically spaced either 16 or 24 inches apart on center. In FIG. 2, the system (200) includes a heat exchange component (230). Another fluid temperature control component—such as a chiller or boiler (not shown)—may also be present. In addition, the system (200) also includes processor and control components (240) configured to control fluid temperatures, adjust flow rates, monitor and control the temperature in the room (210) to ensure it is comfortable for the individuals (220), and measure and record data. In some embodiments, it also includes a display configured to present a user interface to a user, allowing the user to see operating conditions and parameters, trends, etc.

Other embodiments may utilize thermally radiant devices, such as the embodiment depicted in FIG. 1A, each with a single cavity, but flipped such that the IR transparent material—the thermally-active surface—faces the sky. In operation, the thermally-active surface is maintained at a warm temperature, above ambient air temperatures, through the flow of warm fluid through its channels. When this warm surface is exposed visible to the night-time sky, the panel loses heat, or cools, radiatively to the sky. In other embodiments, multiple thermally radiant devices are utilized. In preferred embodiments, the warm fluid is between 5 and 15 degrees C. above ambient air temperatures, or absolutely between 35 and 50 C. In certain embodiments, the system also utilizes an external temperature sensor. In certain embodiments, the system does not pass fluid through the channels if the measured external temperature is not less than the fluid temperature.

Figure 4:
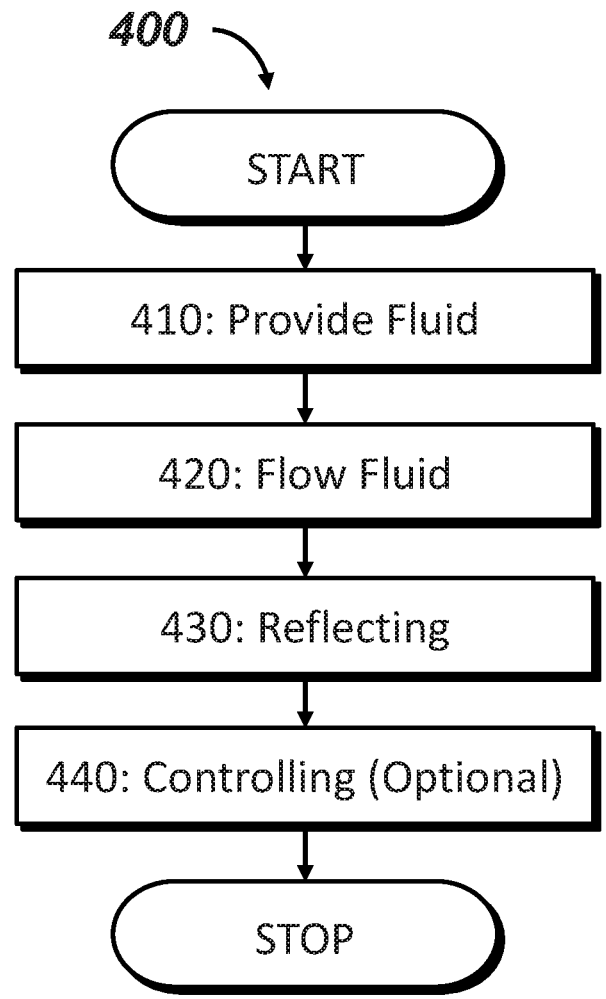
FIG. 4 is a flowchart depicting an embodiment of the disclosed method.

Referring now to FIG. 4, an embodiment of a method (400) for heating or cooling an area is disclosed. A fluid is first provided (410), where the fluid has a temperature either above (for heating) or below (for cooling) the air temperature in the local environment (i.e., the general location that is desired to be heated or cooled, such as a room within a building).

In some embodiments, the temperature of the fluid is below the dew point of air in the local environment. The fluid is then flowed (420) through a channel (e.g., a tube, a pipe, etc.) within a cavity, where the channel is configured to offer radiant cooling or heating. The cavity has an IR transparent membrane between the channel and the local environment. In preferred embodiments, the cavity does not contain a condensation-prevention heating element. In certain embodiment, the cavity contains a desiccant. In certain embodiments, the cavity has at least one non-radiantly activated surface, and each of the non-radiantly activated surfaces exhibit either low emissivity or highly reflective in the IR spectrum.

The process continues by reflecting (430) at least a portion of the radiant cooling or heating through the IR transparent membrane and into the local environment.

Optionally, the process may include a controlling (440) step. In some embodiments, the process may include controlling radiant transfer by adjusting the positioning of a plurality of low emissivity or high reflectivity internal louvres. In other embodiments, the process may include controlling or manipulating the emissivity of an active material coating the membrane.

Various modifications and variations of the invention in addition to those shown and described herein will be apparent to those skilled in the art without departing from the scope and spirit of the invention and fall within the scope of the claims Although the invention has been described in connection with specific preferred embodiments, it should be understood that the invention as claimed should not be unduly limited to such specific embodiments.

In addition, the references listed herein are also part of the application and are incorporated by reference in their entirety as if fully set forth herein.

REFERENCE SIGNS LIST

100—Thermally Radiant Device
101, 102—Thermally Radiant Devices Positioned On/In Ceiling
103, 104—Thermally Radiant Devices Positioned On/In Walls
110—Cavity
120—Frame
130—IR Transparent Membrane
132—Inner Surface Of IR Transparent Membrane
140—Channels
142—Fluid Input For Channel
143—Fluid Input Manifold
144—Fluid Output For Channel
145—Fluid Output Manifold
146—Capillary Tubes
150—Emissive or Reflective Surface
160—Insulation
200—System in a Building
210—Room
220—Individuals
230—Chiller Unit/Heat Transfer Unit
240—Control System
300—System In Outdoor Location
301—Thermally Radiant Device
302—Thermally Radiant Device
310, 311, 312—Cavity
320—Radiative Sky Cooling Panel or Film
321—Lower Surface
322—Upper Surface
330, 335—IR Transparent Membrane
350—Individuals
400—Method
410, 420, 430, 440—Method Steps

CITATION LIST

Interpanel multifunctional ceiling systems, Germany.
R. N. Morse B. E., B. Sc. (1963) Radiant Cooling, Architectural Science Review, 6:2, 50-53.

What is claimed:

1. A system for radiant cooling comprising:
a plurality of radiant cooling and/or heating devices, each radiant cooling and/or heating device being positioned within a room within a building, each radiant cooling and/or heating device comprising:
a cavity within a wall or ceiling of the room, the cavity having an opening into the room, the cavity defined by an inner surface of an IR transparent material that is substantially transparent to at least a portion of infrared (IR) radiation, the IR transparent material configured to separate at least a portion of the cavity from external air, the IR transparent material comprising a polymer, the cavity having a plurality of side walls separating the inner surface of the IR transparent material and a back panel, a distance between the inner surface of the IR transparent material and the back panel being 3.5-12.4 cm;
at least one channel operably connected to a fluid input and a fluid output, the at least one channel positioned within the cavity and adapted for flowing a fluid having a temperature lower or higher than a temperature of external air;
a reflector positioned within the cavity, such that the at least one channel is between the reflector and the IR transparent material; and
a plurality of adjustable low emissivity or high reflectivity internal louvres positioned within the cavity between the at least one channel and the IR transparent material; and
at least one additional component, the at least one additional component being a remote heat exchanger operably connected to the plurality of radiant cooling and/or heating devices, and a photonic solar reflector configured to generate cold directly on or supplied to the cavity, or both.

2. The system according to claim 1, wherein the fluid input and fluid output are each independently configured to pass fluid through one of the plurality of side walls.

3. The system according to claim 1, wherein the cavity has at least one non-radiantly activated surface, and each non-radiantly activated surface is at least one of low emissivity or highly reflective in an IR spectrum.

4. The system according to claim 1, wherein the cavity is capable of being evacuated.

5. The system according to claim 1, wherein the cavity contains a desiccant.

6. The system according to claim 1, wherein a ratio of an area of the opening of the cavity to an inner surface area of the at least one channel is at least 10:1.

7. The system according to claim 1, wherein a temperature of an inner surface of the at least one channel is below a dew point of the external air.

8. The system according to claim 1, wherein the at least one additional component is a photonic solar reflector configured to generate cold directly on or supplied to the cavity.

9. A method of cooling an indoor area, comprising:
providing a fluid having a temperature below that of a temperature of air in a local environment;
passing the fluid through a tube within a cavity having a polymer membrane that is substantially transparent to infrared (IR) between the tube and the local environment, the tube configured to offer radiant cooling, the tube and cavity disposed within a wall or ceiling of a room, the cavity having a plurality of side walls separating an inner surface of the polymer membrane and a back panel, a distance between the inner surface of the polymer membrane and the back panel being 3.5-12.4 cm;
reflecting at least a portion of the radiant cooling through the polymer membrane and into the local environment, and
controlling radiant transfer between the tube and the local environment by adjusting a positioning of a plurality of low emissivity or high reflectivity internal louvres positioned within the cavity between the tube and the polymer membrane.

10. The method according to claim 9, wherein a temperature of the fluid is below a dew point of air in the local environment.

11. The method according to claim 9, wherein the cavity has at least one non-radiantly activated surface, and each one non-radiantly activated surface is at least one of low emissivity or highly reflective in an IR spectrum.

12. The method according to claim 9, wherein the cavity contains a desiccant.

* * * * *

UNITED STATES PATENT AND TRADEMARK OFFICE
CERTIFICATE OF CORRECTION

PATENT NO. : 11,815,287 B2
APPLICATION NO. : 16/764616
DATED : November 14, 2023
INVENTOR(S) : Eric Teitelbaum, Forrest Meggers and Adam Rysanek It is certified that error appears in the above-identified patent and that said Letters Patent is hereby corrected as shown below:

In the Claims

Column 14, Line 22, delete the word "and" before "a photonic solar reflector."

Signed and Sealed this
Thirtieth Day of January, 2024

Katherine Kelly Vidal
*Director of the United States Patent and Trademark Office*